Nov. 9, 1965 J. S. HANSON 3,217,305

GLASS BONDED FERRITE MAGNETIC HEAD

Filed July 19, 1962

INVENTOR
JAMES S. HANSON

BY Melvin P. Williams

ATTORNEY

United States Patent Office 3,217,305
Patented Nov. 9, 1965

3,217,305
GLASS BONDED FERRITE MAGNETIC HEAD

James S. Hanson, 82 Hillis Terrace, Poughkeepsie, N.Y.

Filed July 19, 1962, Ser. No. 211,016
4 Claims. (Cl. 340—174.1)

This invention relates to improvements in magnetic heads of the type in which ferrite pole pieces are fused together with glass.

The magnetic recording art has recently been advanced by the introduction of high frequency magnetic heads which are formed by bonding together appropriately shaped ferrite pieces with glass. As is known in the magnetic head art, the process of making such heads consists generally of forming ferrite structures of sintered ferromagnetic oxide in such a size and shape so that, when bonded together, they will provide the main body portion of a magnetic head. The structures are then placed face to face with a small quantity of glass between them. The glass generally has a thermal expansion coefficient which is very much like that of the ferrite. The ferrite pieces with the glass between them are then heated to a point where the glass melts, and proper pressure is applied so as to cause excess glass to squeeze out, and to leave just sufficient glass between the ferrite pieces as will form a gap of proper proportions. The amount of pressure used is determined by the characteristics of the glass, including viscosity, the area of the surfaces which will form the bond, the temperature used, and the length of the time period of temperature and pressure application.

The manufacture of this type of magnetic head has for the most part been satisfactory. However, it has proven to be difficult if not impossible to achieve, with regularity, gap widths of forty or fifty microinches. Since the high frequency limitation of a magnetic head is in part determined by the width of the gap, it is necessary to provide as narrow a gap as possible in order to utilize the advantages of glass bonded ferrite heads.

It is therefore the main object of this invention to provide a ferrite magnetic head with a gap which is more narrow than has heretofore been available.

Another object is to provide a glass bonded ferrite magnetic head having a more uniform gap thickness over the entire gap.

A further object is to provide a glass bonded ferrite magnetic head which is capable of being manufactured to closer tolerances, and with a predictable uniformity of dimension amongst all heads made, as well as a more constant dimension control over the entire gap of each head, whether the gap is tapered or parallel.

In accordance with the present invention, the ferrite pieces, which are to be bonded together with glass so as to form a magnetic head, are provided with a plurality of grooves on the bonding surfaces. The grooves enhance the flow of molten glass in the bonding area, and also provide for an improved distribution of force across the entire bonding surfaces.

This invention permits manufacture of glass bonded ferrite magnetic heads with more uniform distribution of glass between the ferrite pieces, and with a smaller and more predictable width of gap.

The foregoing and other objects, features and advantages of the invention will be apparent from the following more particular description of preferred embodiments thereof, as illustrated in the accompanying drawings.

In the drawings:

FIGS. 1, 2 and 3 illustrate generally glass bonded ferrite magnetic head structures which are merely representative of the many structures known in the prior art. Each of these structures may be made with or without the advantages of the subject invention, and it is the improvement of these structures to which the subject invention relates.

Figure 1:
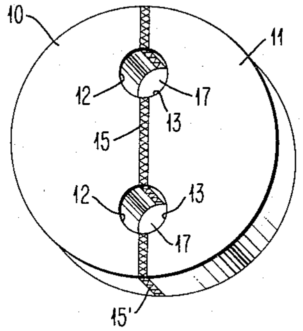
FIG. 1 is a perspective of a glass bonded ferrite magnetic head having two apertures therein.

In FIG. 1, two ferrite pieces 10 and 11 are each formed with depressions 12 and 13, respectively, and are fused together by a glass bonding 15, as is known in the prior art. The semicircular depressions 12, 13, when combined by the bonding of the ferrite pieces 10, 11, form apertures 17 which may receive electrical windings as is well known in the prior art. The glass bonding material 15 also serves to define a front non-magnetic gap area 15' and a rear magnetic gap area (not shown) diametrically opposite to the gap area 15'.

Figure 2:
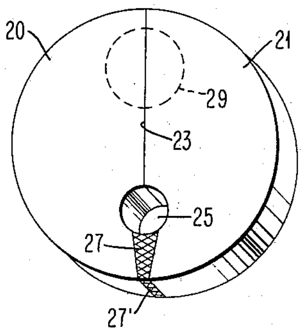
FIG. 2 is a perspective of a glass-bonded ferrite magnetic head having a tapered front gap, a single aperture, and no back gap.

FIG. 2 is an obvious variation in FIG. 1, in which a pair of ferrite pieces 20, 21 are butted together over a substantial area of their mating surfaces as indicated at 23. Only a single aperture 25 is provided, and only a single area of glass bonding 27 is utilized. This provides a magnetic head having a single front gap 27' and no back gap, and since the abutting surfaces 23 of the pieces 20, 21 form a substantially large portion of the diametrical cross section of the head, the reluctance of the rear section of the head (as at 23) is low compared with that of the gap 27'. A small amount of glass may be placed on opposite surfaces of the pieces 20, 21, as shown by the dotted circle 29, to add mechanical strength to the head. This has been found to be a very desirable form of high frequency magnetic recording and reproducing head.

Figure 3:
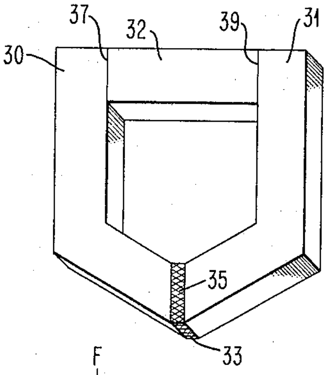
FIG. 3 is a perspective of a conventional glass bonded ferrite magnetic head.

In FIG. 3 is shown a glass bonded ferrite magnetic head comprising two pole pieces 30, 31 which may be joined directly together by a connecting ferrite piece 32. The pieces 30, 31 are shaped so as to define a substantially sharp gap 33 which is formed (as in FIGS. 1 and 2) by a glass bonding 35 that fuses together the ferrite pieces 30, 31. The joints 37, 39 may be made with glass bonding on the surfaces of the pieces 30, 31, 32 (as at 29, FIG. 2), or in any other suitable fashion.

Many other well-known magnetic head configurations are available, and it should be understood that this invention may be utilized to provide an improved glass bonded ferrite magnetic head regardless of which configuration is chosen.

Figure 4:
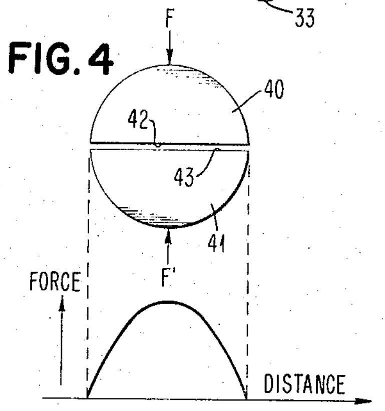
FIG. 4 is a comparative illustration of the distribution of pressure across the mating surfaces of a pair of semicircular ferrite pieces as a function of an applied force.

Consider making the ferrite head shown in either FIG. 1 or FIG. 2. If the head is to conform to the shape shown in FIG. 1, force which is required to cause excess glass to squeeze out and leave a gap of the proper dimension would be applied diametrically, in a plane perpendicular to the plane of the glass 15. Referring now to FIG. 4, two ferrite pieces 40, 41 are illustrated generally with forces F, F′ being applied on a diameter perpendicular to the mating surfaces 42, 43 of the two pieces 40, 41. Shown at the bottom of FIG. 4 is a diagram illustrating the distribution of force across the mating surfaces 42, 43 of the pieces 40, 41. As would be expected, the force is greatest at the very center of the mating surfaces 42, 43, and tapers off at the edges of those surfaces. This tends to provide a force concentration at the center of the bonding area (the mating surfaces 42, 43) which in turn acts somewhat like a pivot point about which either or both of the pieces 40, 41 may rotate slightly as the force is applied. In other words, if either of the forces F, F′ are applied at a point other than a point which is on a diameter of the pieces 40, 41 absolutely perpendicular to the surfaces 42, 43, then the pieces would tend to be forced together to a greater degree at either the right or the left, respectively. This tends to cause the ferrite pieces 40, 41 to be fused together more closely at one end of the bonding area than at the other.

Since high frequency magnetic heads require gaps with very precise dimensions, the tendency for pivoting of the pieces 40, 41 results in the manufacture of a substantial percentage of magnetic heads which cannot be used commercially, and therefore must be thrown away. It is this problem to which the subject invention is primarily directed.

Figure 5:
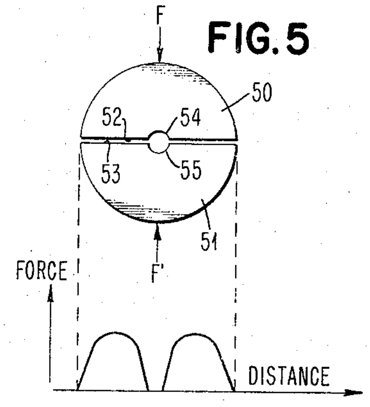
FIG. 5 is an illustration of the pressure distribution across the mating surfaces of a pair of ferrite pieces which results from modifying the device of FIG. 4 by cutting a groove midway in each of the bonding surfaces.

Referring now to FIG. 5, a pair of ferrite pieces 50, 51 is shown with their respective mating surfaces 52, 53 each provided with a groove 54, 55 cut across the surfaces 52, 53 midway in the middle of the surfaces 54, 55. As is well known in the art, it is impossible for force to be applied from one groove (54) to the other groove (55). Thus there have been defined two distinct surfaces for the mutual application of force between the ferrite pieces 50, 51. As shown at the bottom of FIG. 5, the force distribution for the pole pieces 50, 51 will now have two nodes. Thus, the maximum force applied at either of the two surface junctions will be less than the maximum force applied to a single surface junction (such as is shown in FIG. 4), and the maximum force is applied at two points instead of one, which removes the tendency to pivot about a single point, thereby permitting manufacture of gaps which are uniform throughout the entire dimension thereof, even though there may be a slight inclination (or lack of perpendicularity) in the forces F, F′. It should be understood that even more grooves could be made in the pieces 50, 51 thereby creating additional, smaller nodes of force, in proportion to the number of grooves which are provided.

Figure 6:
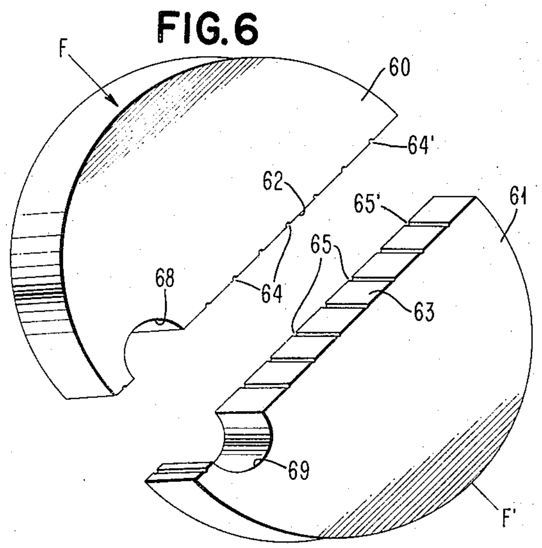
FIG. 6 is a perspective of a pair of ferrite pieces which may be glass bonded so as to form a magnetic head generally of the type shown in FIGS. 1 and 2, and having grooves in the bonding surfaces thereof in accordance with one embodiment of the invention.

In FIG. 6 is shown two ferrite pieces 60, 61 which may be fused together as described so as to form a glass bonded ferrite magnetic head. Each piece 60, 61 is provided with a respective surface 62, 63 which will form the mating surface of the glass bonding between the pieces 60, 61. Each of the surfaces 62, 63 is provided with grooves 64, 65, which grooves subdivide the respective surfaces 62, 63 into $N+1$ areas, where N is the number of grooves. The grooves 64, 65 therefore serve to subdivide the forces which may be applied as at F and F′ into as many force nodes as there are surfaces. The pieces 60, 61 may both be made on the same machinery by the same processes, and therefore have their respective grooves 64, 65 in corresponding positions. However, this is not necessary, and the grooves 64 need not match the grooves 65 as the surface 62, 63 are bonded together. In other words, the grooves 64′ need not lie directly opposite the grooves 65′ in accordance with the subject invention. Similarly, it may suffice to have grooves in only one of the surfaces (i.e., 63) and not in the other (i.e., 62), depending on the size of the pieces, the diameter of the grooves, and other design variables. The grooves 64, 65 not only subdivide the surfaces 62, 63 to provide a more stable force distribution thereacross, but also provide channels through which molten glass may flow, thereby affording relief of pressure at strategic points and therefore tending to increase the ease with which the proper gap dimension can be achieved as heat and pressure are applied. Although the grooves may be very small, it is to be understood that the distance between the pieces 60, 61 may be in the order of forty or fifty microinches after bonding is completed. Therefore, any groove at all will tend to greatly increase the cross sectional area of the space through which excess glass can flow outwardly.

For example, one ferrite head made, in accordance with the present invention, to have a gap of fifty microinches, comprises two ferrite pieces which are approximately a tenth of an inch thick having a diameter of about three tenths of an inch. In this head, eight grooves are provided on each surface 62, 63, each groove having a diameter of roughly five thousandths of an inch, for example. Thus, as the head is being formed, the two ferrite pieces are brought closer and closer together due to the applied pressure. The whole assembly is heated to such a degree that the glass is in the form of a sticky, viscous fluid. All of this viscous fluid (the glass) which is in excess of the amount necessary to fill a fifty microinch gap between the two ferrite pieces must be extruded from between the two pieces during the forming process. Without grooves between the two ferrite pieces, the worst case situation for the flow of glass exists for glass which is found along the longitudinal center line of the gap which must flow outwardly to the semicircular faces of the pole pieces in order to escape from the gap. In the head of the given example, this means that there will be a body of glass along a line three tenths of an inch long which must find its way parallel to the annular axis of the head, and perpendicular to the gap, across a mean-free path of about fifty thousandths of an inch (that is, glass can flow outwardly in two directions, in each direction it will be traveling one half of the thickness of the heads which in this example is one tenth of an inch, or 100 thousandths of an inch). However, when the grooves are added, then the glass is subdivided into $N+1$ portions, where N is the number of grooves provided. Each portion may then flow not only toward the semicircular surfaces of the heads as before described, but may now also flow in a perpendicular direction, toward each of the grooves which is provided. This tends to provide a path for glass to flow towards adjacent grooves which is one half of the distance between grooves. In the given example, this distance is about fifteen thousandths of an inch. It can be estimated roughly that this is equivalent to glass flowing outwardly from a central point to a circumferential edge portion which has a mean-free path somewhat greater than fifteen thousandths of an inch. In other words, the mean-free path is reduced from fifty to about fifteen thousandths of an inch, which roughly corresponds to approximately one third when the grooves are used compared with the head made without grooves. Furthermore, since the glass cannot only flow toward the semicircular surfaces of the ferrite pieces, but also toward the grooves, the cross sectional area of the "pipe" through which the glass can flow has been increased a substantial amount. Recalling that in the example the distance between grooves is approximately thirty thousandths of an inch and that the thickness of the pieces is approximately one tenth of an inch (and therefore the lengths of each groove are approximately one tenth of an inch), the cross sectional area of the pipes through which glass can flow has been increased from approximately sixty thousandths of an inch to approximately two hundred and sixty thousandths of an inch, which may be taken as roughly a fourfold increase. Thus there is a total increase in the viscous flow capability of glass within the gap area which is quite substantial when grooves are provided compared to that which obtains without the grooves.

It should be understood that this invention is concerned with surface preparation of the ferrite pieces to be joined together so as to form a glass bonded ferrite magnetic head. The invention is not concerned with how the pieces are otherwise preformed. For instance, the pieces 60, 61 are shown having semicircular cut-out portions 68, 69, respectively, which together form an aperture in the magnetic head when the pieces 60, 61 are fused together. It is immaterial to this invention whether the semicircular cutouts are formed prior to the fusion, or whether a hole is drilled by ultrasonic techniques, or otherwise, after the pieces 60, 61 are fused together. Thus the ferrite pieces may have no provisions for an aperture prior to being fused together (such as illustrated roughly in FIG. 4) or may have semicircular cut-out portions provided in each of the pieces prior to being fused (as shown in FIG. 6). Furthermore, it is immaterial whether an entire diametrical portion of the magnetic head is fused together with glass (as shown in FIG. 1 and suggested in FIG. 6) or only a small portion thereof is glass bonded as shown in FIG. 2. The point is that the glass bonding may be more effectively and consistently produced if grooves are provided in the mating surfaces of the ferrite pieces prior to being fused together.

Figure 7:
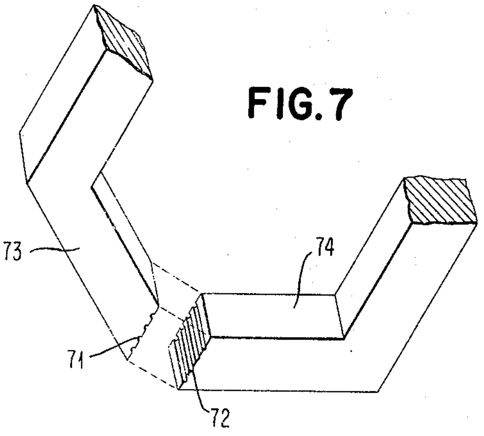
FIG. 7 is a perspective of a pair of ferrite pieces for use in forming a magnetic head generally of the type shown in FIG. 3 and having grooves formed in the bonding surfaces thereof in a manner similar to that shown in FIG. 6, in accordance with a further embodiment of the invention.

FIG. 7 illustrates the positioning of grooves 71 and 72 in respect to ferrite pieces 73, 74 which when fused together may form a ferrite magnetic head of the type shown in FIG. 3. Thus, it can be seen that provision of grooves in the mating surfaces will enhance the glass bonding of ferrite pieces so as to form a glass bonded ferrite magnetic head of any desired configuration.

While the invention has been particularly shown and described with reference to preferred embodiments thereof, and although the specific example of dimensions has been given with reference to FIG. 6, it will be understood by those skilled in the art that various changes in form and details may be made therein without departing from the spirit and scope of the invention.

What is claimed is:

1. A glass bonded ferrite magnetic recording and reproducing head, comprising:

a plurality of circuit parts of ferrite material, one of said parts being provided with a mating surface for ultimate fusion with the mating surface of another one of said plurality of parts, at least one of said mating surfaces having at least one recess therein, there being an effective gap between said two surfaces, said gap and at least a portion of said recess being filled with a glass material mechanically joining and bonding said two mating surfaces.

2. A magnetic recorder head for recording or reproducing magnetic recordings comprising at least two ferrite circuit parts, said circuit parts each having a bonding surface disposed substantially parallel with and proximate to the bonding surface of the other of said two circuit parts with an effective gap between said bonding surfaces, at least one of said surfaces having at least one groove therein, said groove representing an insignificant discontinuity in the thickness of said gap, said gap being filled entirely with a glass material mechanically joining and bonding to each other said bonding surfaces of said circuit parts.

3. An annular magnetic recorder head for recording or reproducing magnetic recordings comprising at least two circuit parts of sintered ferromagnetic oxide material, said circuit parts each having a bonding surface disposed substantially parallel with and proximate to the bonding surface of the other of said two circuit parts with an effective gap between said bonding surfaces, at least one of said surfaces having at least one semicircular groove therein, said semicircular groove being parallel with the annular axis of said recording head, said gap being filled entirely with a glass material mechanically joining and bonding to each other said bonding surfaces of said circuit parts, said glass material being the sole bonding agent between said circuit parts, said glass material having a coefficient of expansion substantially equal to the coefficient of expansion of said sintered ferromagnetic oxide material at the temperature at which the magnetic recorder head is used.

4. In a method of forming an annular glass bonded ferrite magnetic head which comprises sandwiching a piece of glass between two pieces of ferrite at a high temperature so that the glass becomes fused to each of the ferrite pieces thereby forming a glass mechanical bond between the pieces, the glass mechanical bond also comprising an effective non-magnetic gap between the ferrite pieces, the improvement which comprises the step of forming at least one groove in at least one of said ferrite parts upon a surface thereof to which the glass will become fused, said grooves being parallel to the annular axis of the glass bonded ferrite head.

References Cited by the Examiner

UNITED STATES PATENTS

| | | | |
|---|---|---|---|
| 2,852,618 | 9/58 | Hansen | 179—100.2 |
| 2,919,312 | 12/59 | Rosenberger et al. | 179—100.2 |
| 3,094,772 | 6/63 | Duniker | 179—100.2 X |
| 2,104,455 | 9/63 | Frost | 29—155.5 |
| 3,117,367 | 1/64 | Duniker et al. | 29—155.5 |

IRVING L. SRAGOW, *Primary Examiner.*

UNITED STATES PATENT OFFICE

CERTIFICATE OF CORRECTION

Patent No. 3,217,305 November 9, 1965

James S. Hanson

It is hereby certified that error appears in the above numbered patent requiring correction and that the said Letters Patent should read as corrected below.

In the grant, lines 1 to 3, for "James S. Hanson, of Poughkeepsie, New York," read -- James S. Hanson, of Poughkeepsie, New York, assignor to International Business Machines Corporation, of New York, N. Y., a corporation of New York, --; line 12, for "James S. Hanson, his heirs" read -- International Business Machines Corporation, its successors --; in the heading to the printed specification, line 3, for "James S. Hanson, 82 Hillis Terrace, Poughkeepsie, N. Y." read -- James S. Hanson, Poughkeepsie, N. Y., assignor to International Business Machines Corporation, New York, N. Y. a corporation of New York --.

Signed and sealed this 18th day of October 1966.

(SEAL)
Attest:

ERNEST W. SWIDER
Attesting Officer

EDWARD J. BRENNER
Commissioner of Patent